(12) United States Patent
Bell et al.

(10) Patent No.: US 9,390,607 B2
(45) Date of Patent: Jul. 12, 2016

(54) SMART DEVICE SAFETY MECHANISM

(71) Applicant: International Business Machines Corporation, Armonk, NY (US)

(72) Inventors: Denise A. Bell, Austin, TX (US); Jana H. Jenkins, Raleigh, NC (US); Jeffrey A. Kusnitz, Campbell, CA (US); Sarah R. Plantenberg, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 14/099,145

(22) Filed: Dec. 6, 2013

(65) Prior Publication Data

US 2015/0161867 A1    Jun. 11, 2015

(51) Int. Cl.
| | |
|---|---|
| G08B 21/02 | (2006.01) |
| G08B 21/22 | (2006.01) |
| H04W 4/02 | (2009.01) |
| G06Q 40/08 | (2012.01) |
| G08B 25/01 | (2006.01) |

(52) U.S. Cl.
CPC ............... G08B 21/02 (2013.01); G08B 21/22 (2013.01); H04W 4/02 (2013.01); G06Q 40/08 (2013.01); G08B 25/016 (2013.01)

(58) Field of Classification Search
CPC ... G06Q 40/08; G06Q 10/0635; G08B 21/02; G08B 21/22; H04W 4/02; G01C 21/3461
See application file for complete search history.

(56) References Cited

U.S. PATENT DOCUMENTS

| | | | |
|---|---|---|---|
| 8,433,344 B1 | 4/2013 | Virga | |
| 2005/0086004 A1 | 4/2005 | Smith | |
| 2007/0063851 A1* | 3/2007 | Addison et al. ............ | 340/573.1 |
| 2008/0033644 A1* | 2/2008 | Bannon .............. | G01C 21/3461 701/414 |
| 2008/0094230 A1* | 4/2008 | Mock ....................... | G08B 1/08 340/573.4 |
| 2010/0294938 A1* | 11/2010 | Alameh et al. ................ | 250/342 |
| 2010/0330952 A1 | 12/2010 | Yeoman | |
| 2010/0332131 A1* | 12/2010 | Horvitz .............. | G01C 21/3697 701/414 |
| 2011/0046920 A1* | 2/2011 | Amis ...................... | G01S 19/16 702/181 |
| 2011/0213628 A1* | 9/2011 | Peak et al. ......................... | 705/4 |
| 2012/0028600 A1 | 2/2012 | Vallaire | |
| 2012/0124388 A1 | 5/2012 | Chng et al. | |
| 2014/0189016 A1* | 7/2014 | Goldsmith ............. | G06Q 10/06 709/205 |

FOREIGN PATENT DOCUMENTS

| | | |
|---|---|---|
| JP | 2006092311 A | 4/2006 |
| WO | 2008120971 A1 | 10/2008 |

OTHER PUBLICATIONS

Richardson et al., "Boston transit agency launches crime-reporting mobile app," Security Director News, United Publications, Inc., May 24, 2012, 2 pages.

Kuroo, "Location Based 'Safety in Numbers'," Kuroo LLC, 2011-2012, 1 page.

(Continued)

Primary Examiner — Brian Zimmerman
Assistant Examiner — Sara Samson
(74) Attorney, Agent, or Firm — VanLeeuwen & VanLeeuwen; Parashos Kalaitzis

(57) ABSTRACT

An approach is provided in which a smart device identifies a crime risk based upon proximity parameters corresponding to the current location of the smart device. In turn, the smart device determines whether to alert a user of the smart device based upon user preferences and, in turn, alerts the user accordingly.

20 Claims, 9 Drawing Sheets

(56) References Cited

OTHER PUBLICATIONS

"25 Most Dangerous Neighborhood," Daily Finance, AOL Money and Finance, 2013, 2 pages.

Williams, "App That Would Guide Users Away From High-Crime Areas Proves Controversial," CBS, Jan. 17, 2012, 4 pages.

International Search Report and Written Opinion for International Application No. PCT/CN2014/089003, mailed Jan. 26, 2015, 12 pages.

\* cited by examiner

User Configuration Window 500

Risk Tolerance Threshold ← 510

|  | Low | Med | High |
|---|---|---|---|
| Default: | [x] | [ ] | [ ] |
| Group: | [ ] | [x] | [ ] |
| Jogging: | [ ] | [x] | [ ] |

[ ADD SITUATIONAL RISK TOLERANCE THRESHOLD ] ← 515

Risk Avoidance Settings ← 520
- [x] Based on Time of Day
- [x] Based on Demographics
- [x] Risk Avoidance Distance (miles): [ 2.0 ]
- [x] Pedestrian Detection Distance (feet): [ 30 ]
  - [x] Only Enable When Crime Area Proximity Threshold Reached

User Demographics ← 530
- [ ] Elderly
- [ ] Disabled
- [x] Youth
- [x] Male  [x] Female

Alert Actions ← 540
- [ ] Audible Alert
- [x] Visual Alert
- [x] Display Action Option Window

[ SAVE ] ← 550

*FIG. 5*

SMART DEVICE SAFETY MECHANISM

BACKGROUND

Crime rates vary by state, city, and even by neighborhood. Many studies have shown that a relatively safe neighborhood may be adjacent to a relatively dangerous neighborhood. Someone that resides in a particular area may be aware of neighborhoods that pose a higher probability of crime and, in turn, may choose to avoid such neighborhoods. However, a person not familiar with a particular geographical area may not be aware of which areas pose a higher probability of criminal activity.

In addition, people that use electronic devices and earphones to listen to music, news, etc. while walking or exercising may be targets for criminal activity since they are pre-occupied and may have a reduced ability to detect a nearby threat. Furthermore, a criminal may target these victims solely because of their exposed electronics. Other activities such as talking on the phone, texting, playing games, etc. can also reduce a person's ability to detect a nearby threat.

BRIEF SUMMARY

According to one embodiment of the present disclosure, an approach is provided in which a smart device identifies a crime risk based upon proximity parameters corresponding to the current location of the smart device. In turn, the smart device determines whether to alert a user of the smart device based upon user preferences and, in turn, alerts the user accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is a diagram showing an example of a user configuration window that a smart device displays to a user;

DETAILED DESCRIPTION

Figure 1:
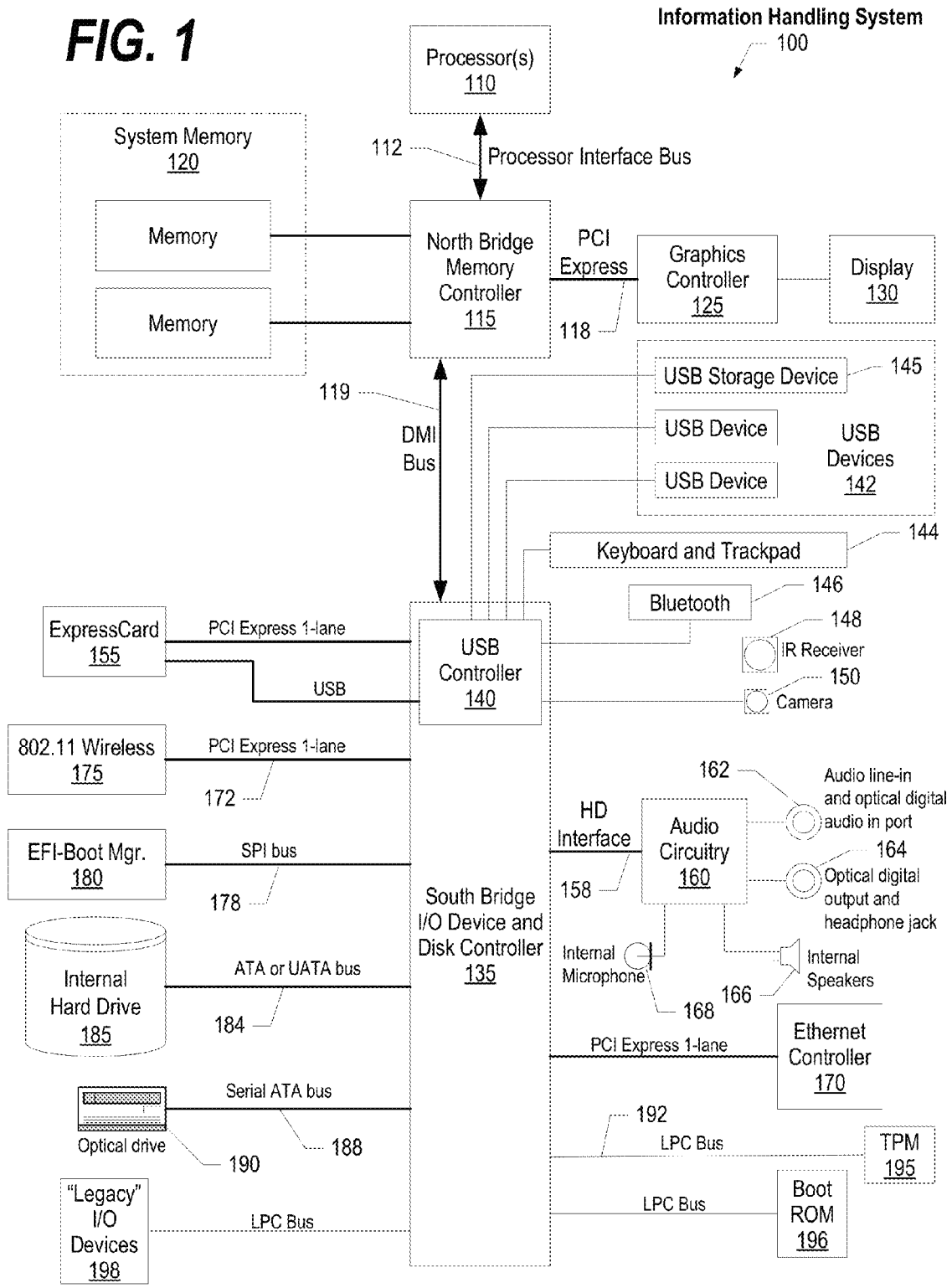
FIG. 1 illustrates an information handling system, which is a simplified example of a computer system capable of performing the computing operations described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
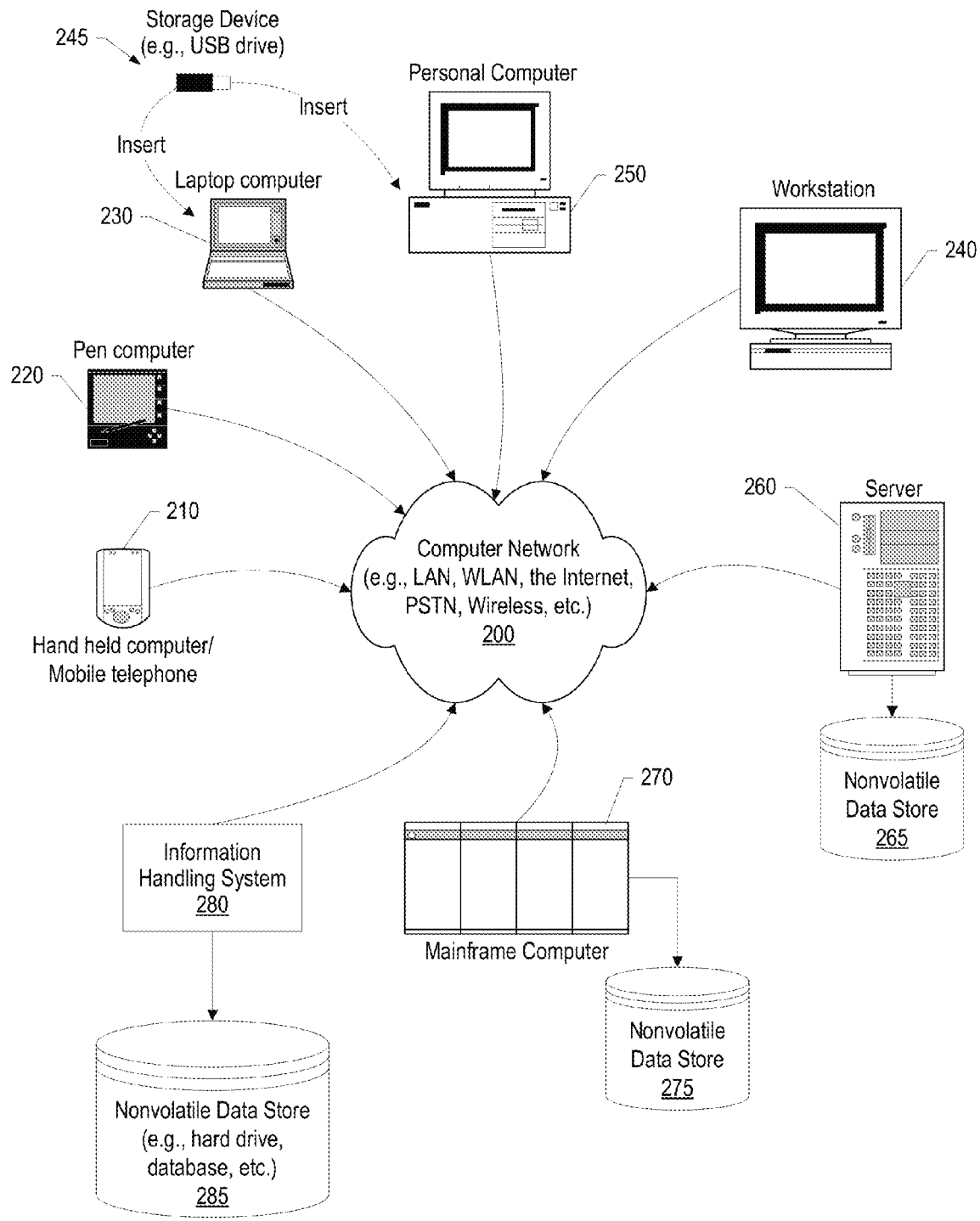
FIG. 2 provides an extension of the information handling system environment shown in FIG. 1 to illustrate that the methods described herein can be performed on a wide variety of information handling systems that operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-9 depict an approach that can be executed on an information handling system, such as a mobile device, and computer network as shown in FIGS. 1-2. A smart device includes a risk analyzer that identifies a crime risk based upon proximity parameters. The proximity parameters may include, for example, a high crime area and/or a nearby pedestrian that is approaching the user of the smart device. In one embodiment, the smart device calculates a risk level of a user's situation based upon the user's current location and area parameters such as historical crime data and/or pedestrian traffic. When the calculated risk level reaches a risk tolerance threshold corresponding to the user, the smart device generates an alert such as an audio tone or a visual alert. In one embodiment, the smart device displays "risk reduction options," such as an option to call a taxi service, an option to call 911, an option to display nearby bus routes, an option to display nearby retail stores, etc.

In another embodiment, the smart device calculates risk values and based upon the smart device user's demographic information. In this embodiment, the smart device may generate an early warning alert for an elderly or disabled person as the user approaches a risk area. In yet another embodiment, the smart device compares risk area victim demographics with the user's demographics to determine whether the user is at an increased risk. For example, a risk area may have a concentrated amount of assaults on elderly people and, in turn, the smart device may generate an early warning alert if the smart device's user is elderly.

Figure 3:
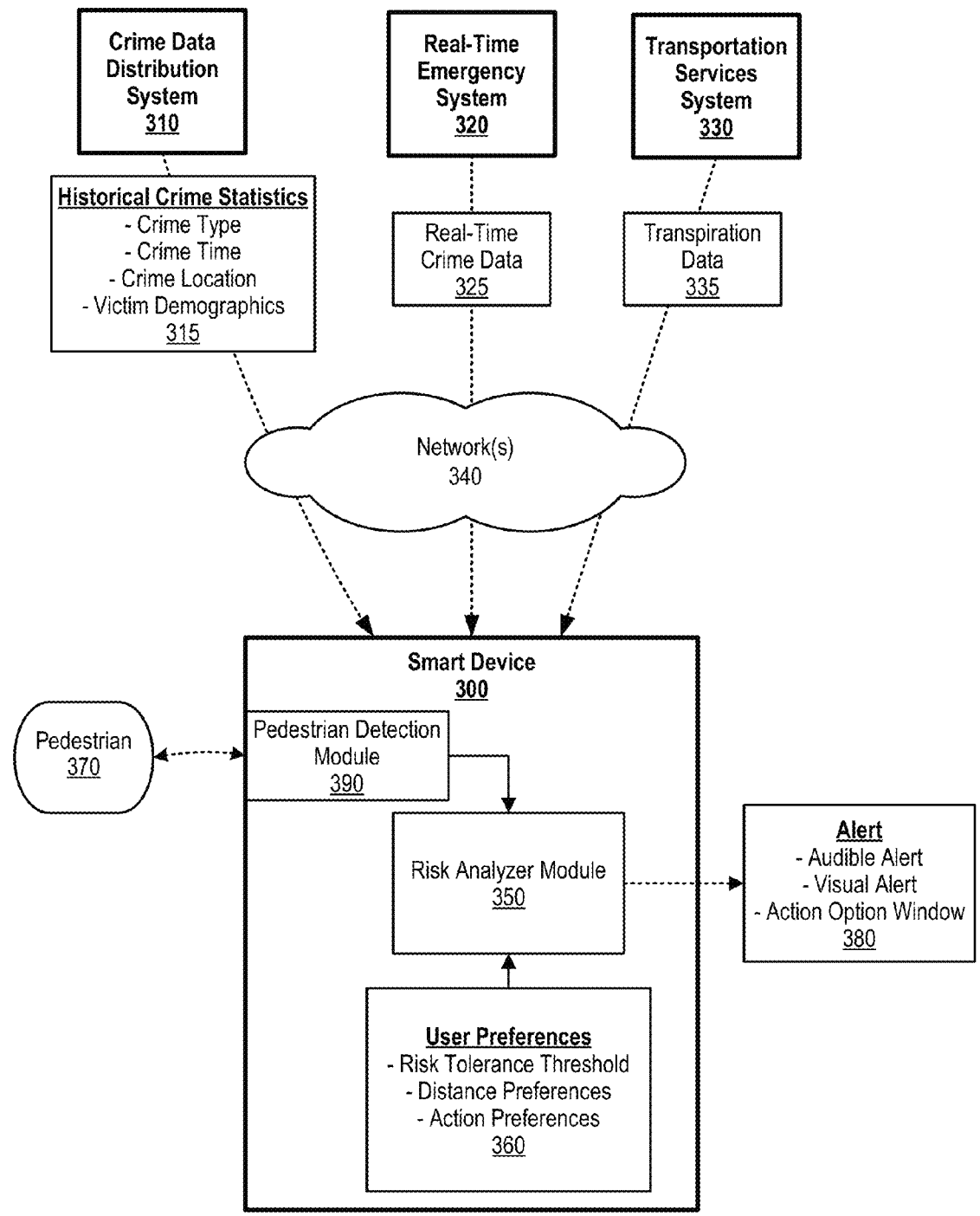
FIG. 3 is a diagram showing a smart device generating alert messages based upon proximate geographical conditions and user preferences.

FIG. 3 is a diagram showing a smart device generating alert messages based upon proximate geographical conditions and user preferences. Smart device 300 includes risk analyzer module 350, which identifies a crime risk based upon proximity parameters (e.g., historical crime statistics 315 and/or pedestrian 370) and generates an alert to a user of smart device 300 based upon user preferences 360.

In one embodiment, risk analyzer module 350 computes a risk value (e.g., a risk probability) based upon area parameters and user preferences. Area parameters include, in one embodiment, historical crime statistics 315 provided by crime data distribution system 310, which includes crime information such as the type of crime, the time of crimes, the crime locations, and victim demographics. User preferences 360 includes, in one embodiment, risk tolerance thresholds configured by the user. In one embodiment, the user may configure several situational risk tolerance thresholds based upon particular situations, such as when the user is with a group of people, when the user is jogging, when the user is listening to music, etc. In yet another embodiment, smart device 300 may compute a risk tolerance threshold based upon user demographics, such as whether the user is disabled, elderly, etc.

Figure 6:
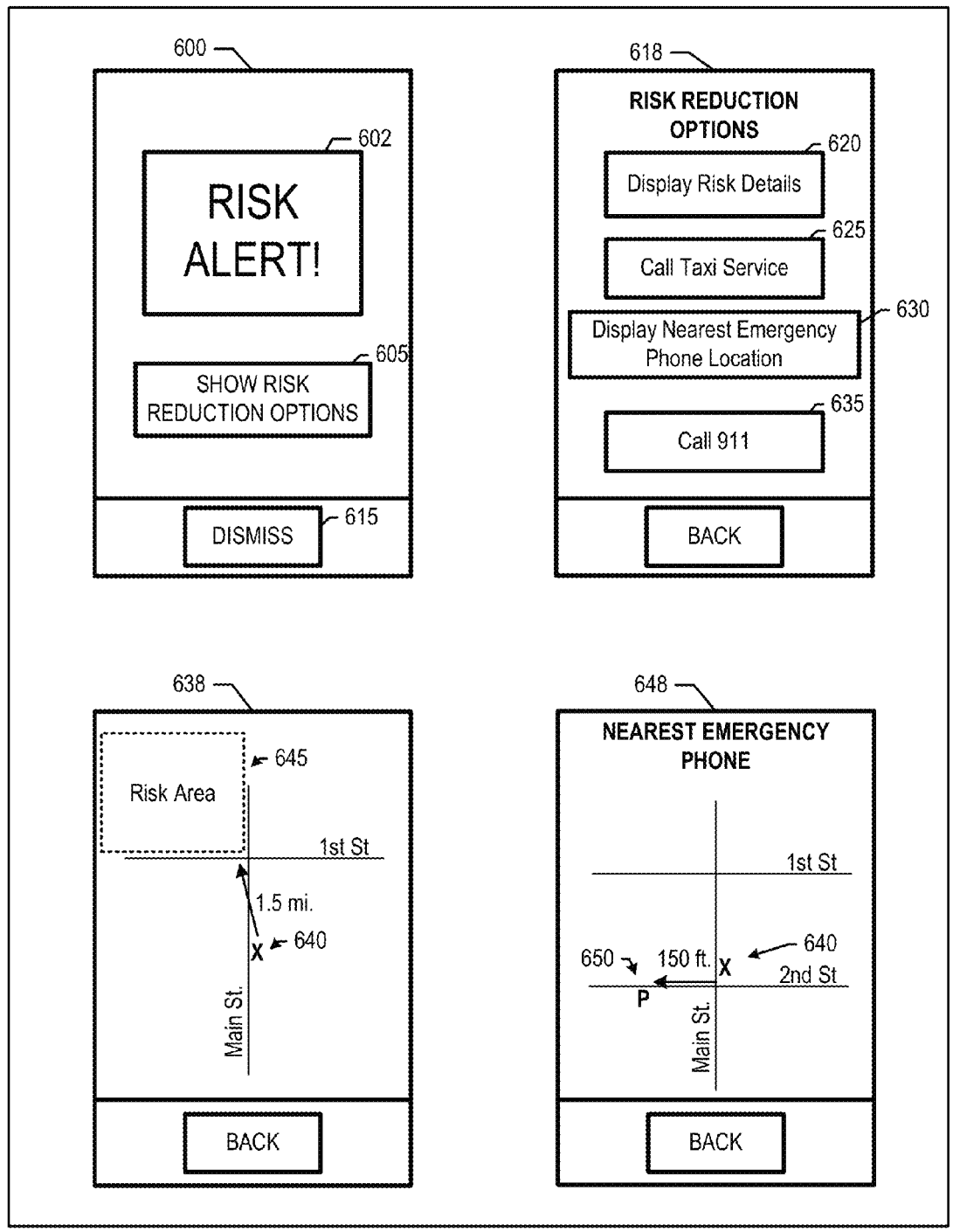
FIG. 6 is a diagram showing various visual alert windows displayed by a smart device.

When the computed risk value reaches a risk tolerance threshold, risk analyzer module 350 generates alert 380 that may be, for example, an audible alert and/or a visual alert that displays a graphical depiction of the risk and risk reduction options (e.g., displaying bus route locations, calling 911, etc., see FIG. 6 and corresponding text for further details).

Figure 7:
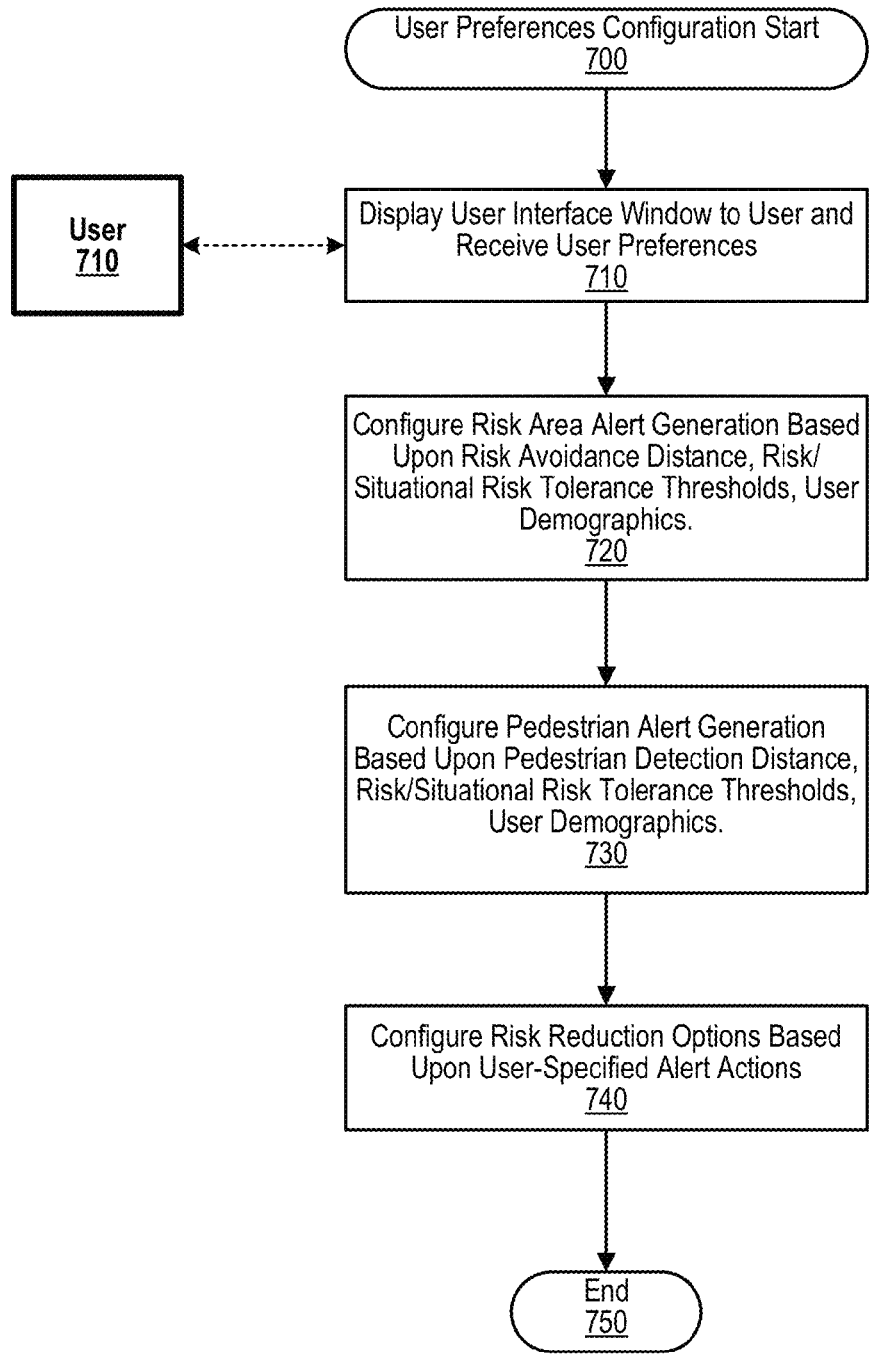
FIG. 7 is a flowchart showing one example of steps taken in configuring a smart device to monitor nearby crime risks.

Smart device 300's user provides user preferences 360 to smart device during a configuration process (see FIGS. 5, 7, and corresponding text for further details). User preferences 360 may include a user-specified risk tolerance threshold (e.g., low, medium, high) that indicates the amount of risk that the user is willing to tolerate before being alerted by smart device 300. For example, an elderly person may have a low risk tolerance threshold and may wish to be informed of any crime area within a 5 mile radius, while a young, active person may have a high risk tolerance threshold and may wish to be informed when the user is within ½ mile from a high crime area.

In one embodiment, user preferences 360 may include user demographics. In this embodiment, smart device 300 may be configured to provide an early warning signal when a user approaches a high crime area that includes victim demographics similar to the user demographics. For example, an elderly person may be provided with an early warning signal when the elderly person is approaching a crime area that has a high number of crime incidents of elderly people. In yet another embodiment, smart device 300 may compute and provide a suggested risk tolerance level based upon the user demographics. For example, smart device 300 may suggests a low risk tolerance level for a disabled person and suggest a medium risk tolerance level for other users.

Once the user provides user preferences 360 to smart device 300, smart device 300 initializes and receives historical crime statistics 315 from crime data distribution system 310, which may include information such as crime locations, the type of crimes, the time of day of the crimes, and victim demographics (e.g., elderly people, women, children, etc.). In one embodiment, historical crime statistics 315 may be downloaded wirelessly to smart device 300 through network 340, such as through a cellular network or Wi-Fi network. In another embodiment, historical crime statistics 315 may be downloaded from a user's computer via USB connection, which the user's computer obtains from a crime data website or a DVD.

Risk analyzer module 350 identifies risk areas based upon historical crime statistics 315 based upon, for example, the amount of crime per capita. In one embodiment, historical crime statistics 315 may identify geographical areas that are high risk areas.

Risk analyzer module 350 obtains the user's current location (e.g., GPS module included in smart device 300) and determines whether a risk area is within a "risk avoidance distance" (included in user preferences 360) from the user's current location. When the user's current location is within the risk tolerance distance of a crime area, risk analyzer module 350 determines whether the risk value reaches the user's risk tolerance threshold (low, medium, high). For example, the risk value may correspond to a probability of the user becoming a victim, where a value of 0-30 is low, 31-70 is medium, and 71-100 is high.

When risk analyzer module 350 determines that the user's risk tolerance has been reached, risk analyzer module 350 generates alert 380, which may be an audio alert and/or a visual alert. Alert 380 may include risk reduction options for the user to select, such as displaying the risk area, calling 911, calling a taxi, displaying nearby safety locations such as a 24-hour convenience store, etc. (see FIG. 6 and corresponding text for further details). In one embodiment, smart device 300 receives transportation data 335 from transportation services system 330 that includes bus route information, city zip car locations (e.g., rentable cars), etc. In this embodiment, transportation data 335 may be displayed by smart device 300 during an alert event.

In another embodiment, smart device 300 receives real-time crime data 325 (scanner data) from real-time emergency system 320 over network 340. Scanner data 325 may include real-time crime information or emergency information that corresponds to the user's current location, such as "police in pursuit of a robbery suspect at 5th and Main." This real-time information is useful to a user as an early warning mechanism to avoid risk areas.

Smart device 300 may also include pedestrian detection module 390, which is capable of detecting pedestrian 370 in proximity to smart device 300 using techniques such as heat sensor footprint detection and/or digital footprint detection (for pedestrians carrying digital devices). In this embodiment, smart device 300 detects pedestrian 370 and determines whether pedestrian 370 poses a crime risk to smart device 300's user based upon user preferences such as a user-specified pedestrian detection distance, a pedestrian risk tolerance threshold specified by the user, the user's relative distance to a high risk area, etc. In another embodiment, pedestrian detection module 390 may be configured to detect a pedestrian 370's digital footprint and compare the digital footprint with smart device 300's contact information to determine whether pedestrian 370 is a friend of smart device 300's user. In this embodiment, smart device 300 may determine that pedestrian 370 is a friend traveling with smart device 300's user and, in turn, increase the user's risk tolerance threshold accordingly since the user is traveling in a group.

Figure 4:
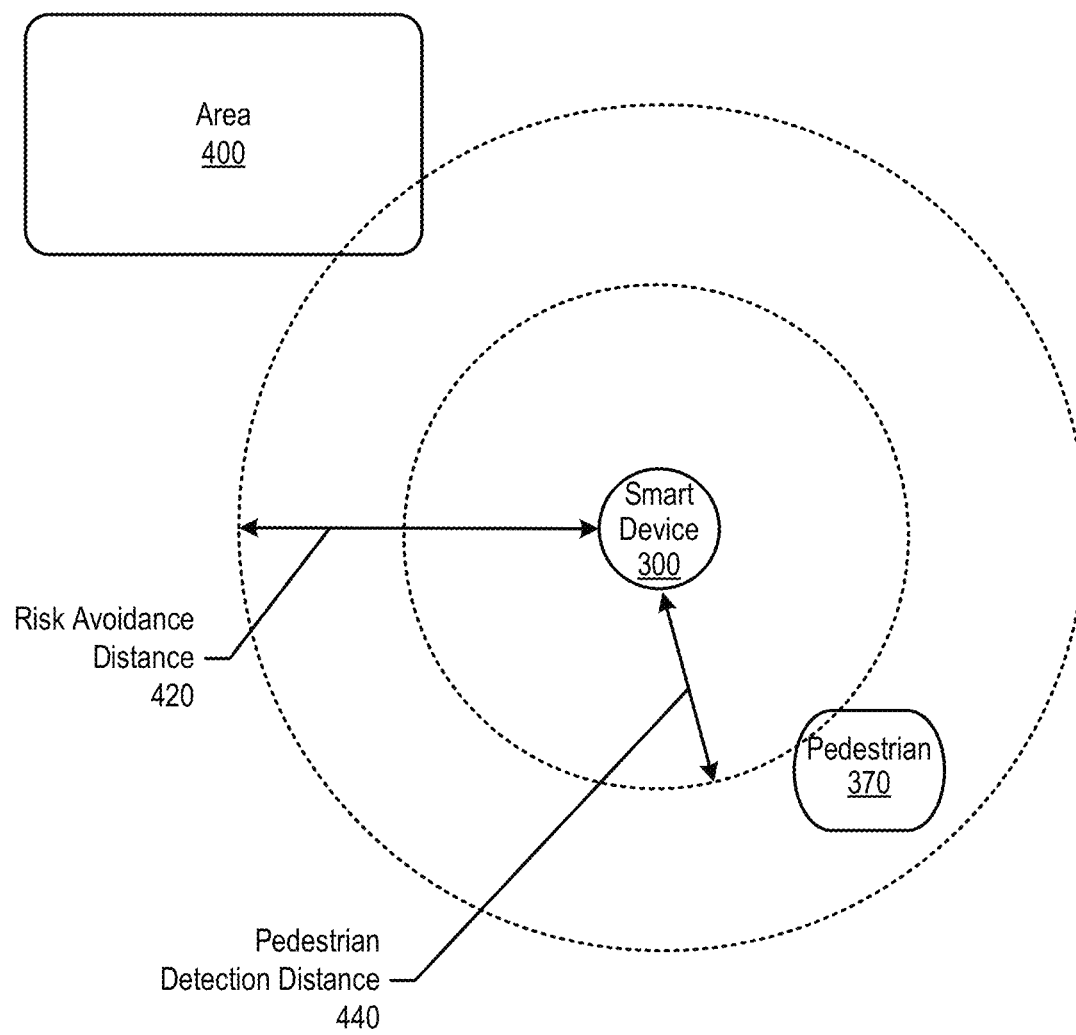
FIG. 4 is a diagram showing a user's smart device identifying potential crime risks.

FIG. 4 is a diagram showing a user's smart device 300 identifying potential crime risks. Smart device 300 determines that area 400 is a risk area based upon historical crime statistics 315. Area 400 may be a particular neighborhood, shopping mall, parking lot, etc., which historical crime statistics 315 indicates is a high crime area. In one embodiment, area 400 may be considered a risk area between the hours of 9:00 PM through 8:00 AM based upon the time of day of crimes committed in area 400. FIG. 4 shows risk avoidance distance 420 that, in one embodiment, the user specifies while configuring user preferences (see FIG. 5 and corresponding text for further details). For example, the user may specify a risk avoidance distance of "2.0" miles. In this example, smart device 300 generates an alert whenever the user's current location is within the risk avoidance distance from a risk area corresponding to a risk value that reaches the user's risk tolerance threshold.

In one embodiment (shown in FIG. 4), pedestrian 370 is in proximity to smart device 300. Smart device 300 detects pedestrian 370 via heat sensor technology or digital footprint technology, and determines that pedestrian 370 is entering pedestrian detection distance 440. Pedestrian detection distance 440, in one embodiment, is set by the user during user preference configuration. Smart device 300 may analyze the digital footprint of pedestrian 370 and determine whether pedestrian 370 is a friend of smart device 300's user (e.g., matching a phone number with a contact's phone number). When pedestrian 370 is not identified as a contact, smart device 300 may invoke an alert to inform smart device 300's user of pedestrian 370's location. When the user is in a more vulnerable situation, such as when the user is listening to the radio or music, smart device 300 may automatically extend pedestrian detection distance 440 to give the user more time to react accordingly. As those skilled in the art can appreciate, a user may configure smart device 300 to identify a crime risk based upon independent analysis of high crime areas and nearby pedestrians, or based upon combinational analysis of high crime areas and nearby pedestrians (e.g., monitor pedestrian traffic only when near a high crime area).

FIG. 5 is a diagram showing an example of a user configuration window that smart device 300 displays to a user. User configuration window 500 includes a section for a user to specify risk tolerance thresholds (510). As can be seen, risk tolerance threshold configuration section 510 allows a user to specify a default crime tolerance threshold (e.g., traveling alone) as well as a situational risk tolerance threshold (e.g., traveling in a group, jogging, etc.). Risk tolerance threshold configuration section 510 also includes selection button 515, which a user selects to add additional situational risk tolerance thresholds, such as "Driving," "Listening to Music," etc.

Risk avoidance settings section 520 allows a user to input various distance preferences and other preferences to customize alerts, such as computing risk values based upon a time of day, user demographics compared with victim demographics, etc. In addition, risk avoidance settings section 520 includes text boxes for a user to enter a risk avoidance distance (e.g., 2 miles) and a pedestrian detection distanced (e.g., 30 feet).

User demographics section 530 includes a list of options that the user may select based upon the user's demographics. Smart device 300 may use the user demographics for a variety of reasons, such as to match the user demographics with victim demographics of a high crime area to determine a level at which the user is in danger. For example, an elderly person entering a high crime area that statistically targets elderly victims would be a potentially high crime risk situation for the user.

Alert actions selection section 540 allows the user to select various alerts such as an audio alert, a visual alert, and an action option window (see FIG. 6 and corresponding text for further details). When the user is finished entering configuration information, the user selects save button 550 to save the configuration information and exit user configuration window 500.

FIG. 6 is a diagram showing various visual alert windows displayed by a smart device. As discussed herein, smart device 300 repeatedly compares a user's current location against risk areas and/or nearby pedestrian locations to determine whether a potential crime risk exists. When a crime risk exists relative to user preferences, smart device 300, in one embodiment, displays a risk alert such as that shown in window 600. Risk alert 602 may be flashing to get the user's attention, and/or smart device 300 may generate an audible signal to inform the user of a potential risk.

When the user notices risk alert 602, the user may select button 615 to dismiss the alert and return to a previously viewed screen, or the user may select button 605, which instructs smart device to display a list of risk reduction options (window 618). Window 618, in one embodiment, includes button 620, which allows a user to view details of an identified crime risk (window 638). The user may select button 625 that, in one embodiment, instructs smart device 300 to identify a taxi service phone number and call the taxi service. In one embodiment, smart device 300 may send the user's location to the taxi service, which causes the taxi service to connect the user directly to a closest taxi driver. Button 630 instructs smart device 300 to display a nearest emergency phone, such as that shown in window 648. Button 635 calls 911 and, in one embodiment, sends the user's location to the 911 dispatch system.

Window 638 graphically displays a relative location of a risk area. Smart device 300 may display the user's location (640) and the detected risk area 645 on in a graphical format in order for the user to comprehend the direction and distance of a potential risk area. In addition, smart device 300 may display a potential pedestrian risk when a pedestrian is detected nearby that includes a distance to the detected pedestrian and/or the number of nearby pedestrians.

Window 648 graphically displays a relative location of a nearby emergency telephone. When a user selects button 630 (shown in window 618), smart device 300 displays the nearest phone location (650) relative to the user's location (640) on window 648, and may also display a suggested route to reach the nearest phone location. This type of graphical display may also be used if the user wishes to view a closest rental car location, a bus stop location, a taxi service location, a 24-hour convenience store location, etc.

FIG. 7 is a flowchart showing one example of steps taken in configuring a smart device to monitor nearby crime risks. User preferences configuration commences at 700, whereupon the smart device displays a user interface window to a user (e.g., window 500 shown in FIG. 5) and receives the user's preferences (710). At 720, the smart device configures risk area alert parameters based upon the user specified risk avoidance distance, risk tolerance thresholds, situational risk tolerance thresholds, and user demographics. In one embodiment, the smart device automatically computes the user's risk avoidance distances based upon the user's risk tolerance thresholds and the user's demographics. For example, the smart device may compute a risk avoidance distance of 5 miles for a disabled person with low risk tolerance thresholds, but compute a risk avoidance distance of 1,000 feet for a young person with a high risk tolerance threshold.

The smart device, at 730, configures pedestrian alert parameters based upon the user specified pedestrian detection distance, risk tolerance thresholds, situational risk tolerance thresholds, and user demographics. In one embodiment, the smart device automatically computes the user's pedestrian detection distances based upon the user's risk tolerance thresholds and the user's demographics.

At 740, the smart device configures risk reduction options based upon alert actions specified by the user during the configuration process (e.g., audio alert, visual alert, etc.). In one embodiment, the user may specify particular options in which to display, such as a call 911 option, display closest emergency phone option, etc. Smart device configuration processing ends at 750.

Figure 8:
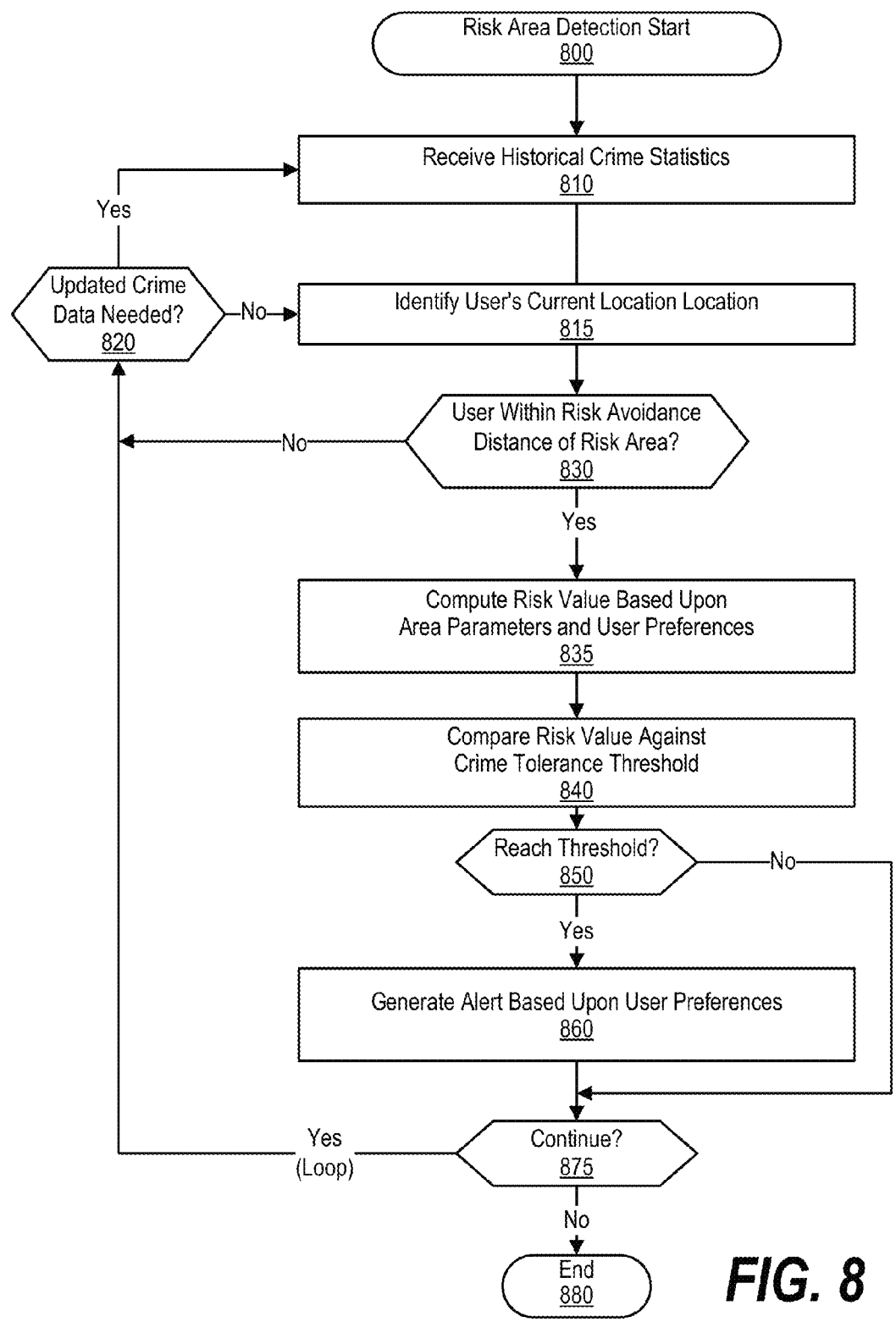
FIG. 8 is a flowchart showing one example of steps taken by a smart device to generate an alert in response to detecting a nearby risk area.

FIG. 8 is a flowchart showing one example of steps taken by a smart device to generate an alert in response to detecting a nearby risk area. Processing commences at 810, whereupon the smart device receives and processes historical crime statistics, such as through a wireless connection or a wired connection. The smart device identifies the user's current location at 815 via GPS or triangulation, and determines whether the user is within a risk avoidance distance of a risk area (decision 830). For example, the user's risk avoidance distance may be set at 2.0 miles and a high crime area may be 1.5 miles away from the user's location.

If the smart device determines that a risk area is not within the user's risk avoidance distance, decision 830 branches to the "No" branch, whereupon a determination is made as to whether to receive updated historical crime statistics (decision 820). For example, the smart device may retrieve five square miles of historical crime statistics during each retrieval and the user is entering a different area of the city. In another example, the smart device may automatically download updated historical crime statistics once a week. If the smart device should update the historical crime statistics, decision 820 branches to the "Yes" branch, whereupon the smart device receives historical crime statistics at 810. On the other hand, if the smart device does not need to update historical crime statistics, decision 820 branches to the "No" branch, whereupon the smart device continues to monitor the user's location.

When the smart device determines that a risk area is within the user's risk avoidance distance, decision 830 branches to the "Yes" branch, whereupon the smart device computes a risk value based upon area parameters and user preferences. For example, the smart device may compute a risk value based upon the risk area's crime types, crime of day, etc. In another embodiment, the smart device may generate a customized risk value based upon the risk area's victim demographics compared with the user demographics.

The smart device, at 840, compares the risk value against the user's risk tolerance threshold (e.g., low, med, high), and a determination is made as to whether the risk value has reached the risk tolerance threshold (decision 850). If the risk value has reached the risk tolerance threshold, decision 850 branches to the "Yes" branch, whereupon the smart device generates an alert based upon the user preferences at 860 (audio, visual, etc.). On the other hand, if the risk value has not reached the risk threshold, decision 850 branches to the "No" branch, bypassing alert generation steps. In one embodiment, the smart device displays risk reduction options and processes user selections accordingly (see FIG. 6 and corresponding text for further details).

A determination is made as to whether to continue monitoring the user's surroundings and generate risk alerts accordingly (decision 875). If the smart device should continue monitoring the user's surroundings and generate risk alerts as needed, decision 875 branches to the "Yes" branch, which loops back to monitor the user's surroundings. This looping continues until the smart device should terminate risk monitoring steps, at which point decision 875 branches to the "No" branch, whereupon processing ends at 880.

Figure 9:
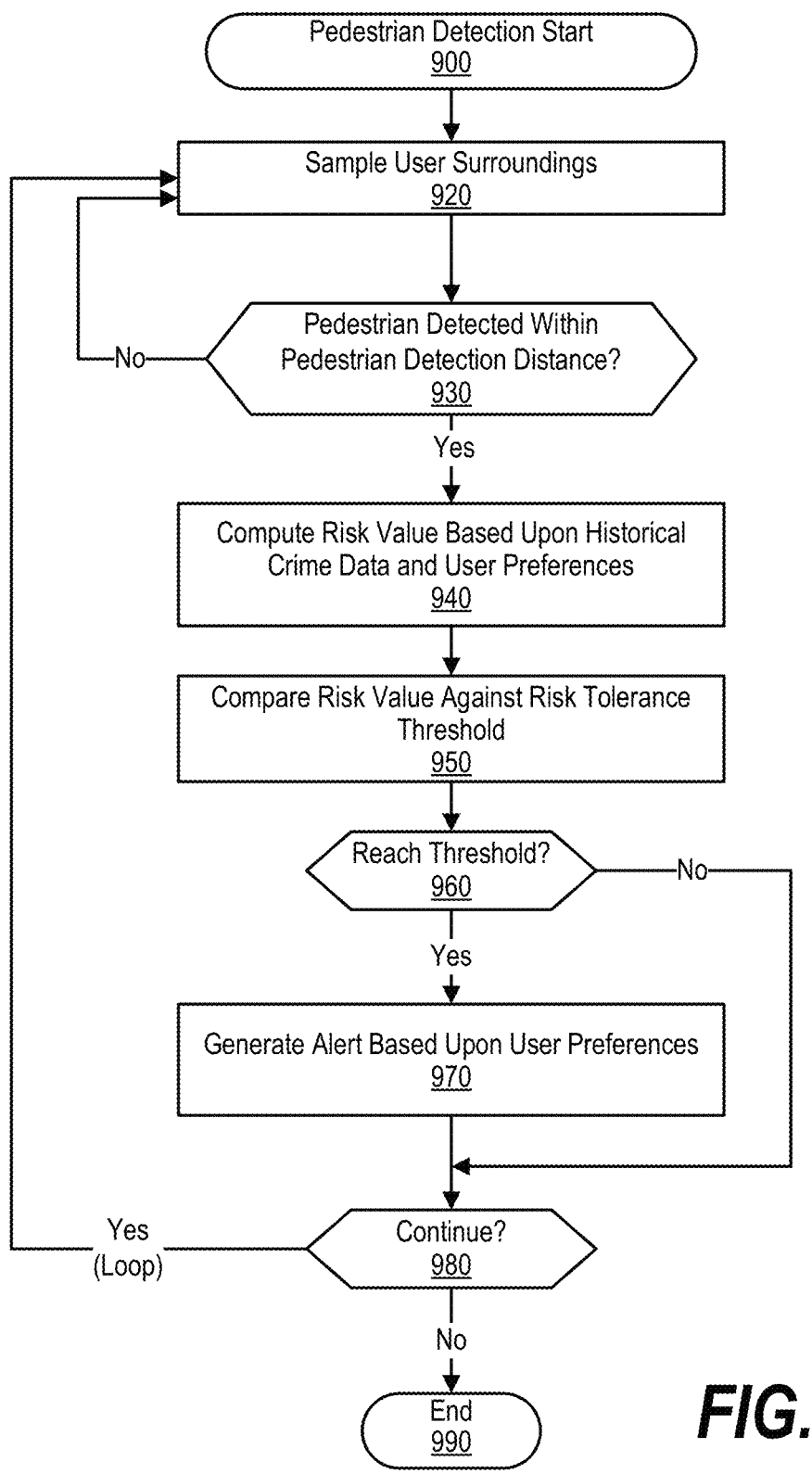
FIG. 9 is a flowchart showing one example of steps taken by a smart device to generate an alert in response to detecting a nearby pedestrian.

FIG. 9 is a flowchart showing one example of steps taken by a smart device to generate an alert in response to detecting a nearby pedestrian. Processing commences at 900, whereupon the smart device samples the user surroundings at 920, such as though heat sensing technology or digital footprint technology.

A determination is made as to whether a pedestrian has been detected within the user-specified pedestrian detection distance (decision 930). If a pedestrian has not been detected, decision 930 branches to the "No" branch, which loops back to continue to monitor the user's surroundings. This looping continues until the smart device detects a pedestrian within the pedestrian detection distance, at which point decision 930 branches to the "Yes" branch.

The smart device, at 940, computes a risk value, in one embodiment, based upon localized historical crime statistics and user preferences. For example, the smart device may determine that the user is in a relatively safe neighborhood and not apply much weighting to the risk of the nearby pedestrian. In one embodiment, the smart device increases the risk value when the smart device's user is disabled and/or elderly.

At 950, the smart device compares the risk value against the user-specified risk tolerance threshold, and a determination is made as to whether the risk value has reached the risk tolerance threshold (decision 960). If the risk value has reached the risk tolerance threshold, decision 960 branches to the "Yes" branch, whereupon the smart device generates an alert based upon the user preferences at 970 (audio, visual, etc.). On the other hand, if the risk value has not reached the risk threshold, decision 960 branches to the "No" branch, bypassing alert generation steps. In one embodiment, the smart device displays risk reduction options and processes user selections accordingly (see FIG. 6 and corresponding text for further details).

A determination is made as to whether to continue monitoring the user's surroundings and generate risk alerts accordingly (decision 980). If the smart device should continue monitoring the user's surroundings and generate risk alerts as needed, decision 980 branches to the "Yes" branch, which loops back to monitor the user's surroundings. This looping continues until the smart device should terminate risk monitoring steps, at which point decision 980 branches to the "No" branch, whereupon processing ends at 990.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method of providing an alert to a user of a smart device, wherein the method comprises:
   detecting a pedestrian within a pedestrian detection distance, wherein the detecting includes identifying a digital footprint of the detected pedestrian;
   determining, based on an analysis of the digital footprint, if the detected pedestrian is friendly;
   increasing a risk tolerance threshold in response to determining that the detected pedestrian is friendly;
   identifying, by the smart device, a crime risk based upon one or more proximity parameters corresponding to a current location of the smart device;
   determining whether to alert the user of the identified crime risk based upon one or more user preferences, wherein the one or more user preferences includes at least the risk tolerance threshold; and
   generating an alert in response to the determination.

2. The method of claim 1 further comprising:
calculating, by the smart device, a risk value according to a set of area parameters included in the proximity parameters;
determining whether the risk value reaches the risk tolerance threshold included in the one or more user preferences; and
performing the generation of the alert in response to the risk value reaching the risk tolerance threshold.

3. The method of claim 2 wherein the set of area parameters include one or more historical crime statistics, and wherein at least one of the one or more historical crime statistics is selected from the group consisting of a crime type, a crime time, a crime location, and a victim demographic.

4. The method of claim 3 further comprising:
identifying a risk avoidance distance included in the one or more user preferences;
determining that one or more risk areas are located within the risk avoidance distance from the current location, wherein the one or more risk areas are identified based upon the one or more historical crime statistics; and
displaying the current location and the one or more risk areas located within the risk avoidance distance.

5. The method of claim 4 further comprising:
determining whether a time-based risk corresponds to the risk area by comparing a current time with one or more of the crime times included in the historical crime statistics;
determining whether a demographic-based risk corresponds to the user by comparing one or more user demographics included in the user preferences to the one or more victim demographics; and
utilizing the time-based risk and the demographic-based risk during the calculation of the risk value.

6. The method of claim 2 wherein at least one of the user preferences is selected from the group consisting of the risk tolerance threshold, a situational risk tolerance threshold, a risk avoidance distance, a pedestrian detection distance, a user demographic, and a user activity.

7. The method of claim 2 further comprising:
receiving real-time crime data over a wireless network; and
utilizing the real-time crime data during the calculation of the risk value.

8. The method of claim 1 wherein the alert further comprises:
displaying one or more risk reduction options to the user, wherein at least one of the one or more risk reduction options are selected from the group consisting of a taxi call option, a 911 call option, a display risk details option, and a display emergency phone location option.

9. The method of claim 1 further comprising:
enabling a pedestrian detection module in the smart device; and
wherein the pedestrian detection distance is included in the one or more user preferences.

10. A mobile device comprising:
one or more processors;
a memory coupled to at least one of the processors;
a set of computer program instructions stored in the memory and executed by at least one of the processors in order to perform actions of:
detecting a pedestrian within a pedestrian detection distance, wherein the detecting includes identifying a digital footprint of the detected pedestrian;
determining, based on an analysis of the digital footprint, if the detected pedestrian is friendly;
increasing a risk tolerance threshold in response to determining that the detected pedestrian is friendly;
identifying a crime risk based upon one or more proximity parameters corresponding to a current location of the mobile device;
determining whether to alert the user of the identified crime risk based upon one or more user preferences, wherein the one or more user preferences includes at least the risk tolerance threshold; and
generating an alert in response to the determination.

11. The mobile device of claim 10 wherein at least one of the one or more processors perform additional actions comprising:
calculating a risk value according to a set of area parameters included in the proximity parameters;
determining whether the risk value reaches the risk tolerance threshold included in the one or more user preferences; and
performing the generation of the alert in response to the risk value reaching the risk tolerance threshold.

12. The mobile device of claim 11 wherein the set of area parameters include one or more historical crime statistics, and wherein at least one of the one or more processors perform additional actions comprising:
identifying a risk avoidance distance included in the one or more user preferences;
determining that one or more risk areas are located within the risk avoidance distance from the current location, wherein the one or more risk areas are identified based upon the one or more historical crime statistics; and
displaying the current location and the one or more risk areas located within the risk avoidance distance.

13. The mobile device of claim 12 wherein at least one of the one or more processors perform additional actions comprising:
determining whether a time-based risk corresponds to the risk area by comparing a current time with one or more crime times included in the one or more historical crime statistics;
determining whether a demographic-based risk corresponds to the user by comparing one or more user demographics included in the user preferences to the one or more victim demographics; and
utilizing the time-based risk and the demographic-based risk during the calculation of the risk value.

14. The mobile device of claim 11 wherein at least one of the one or more processors perform additional actions comprising:
receiving real-time crime data over a wireless network; and
utilizing the real-time crime data during the calculation of the risk value.

15. The mobile device of claim 10 wherein at least one of the one or more processors perform additional actions comprising:
enabling a pedestrian detection module in the mobile device; and
wherein the pedestrian detection distance is included in the one or more user preferences.

16. A computer program product stored in a non-transitory computer readable medium, comprising computer program code that, when executed by a mobile device, causes the mobile device to perform actions comprising:
detecting a pedestrian within a pedestrian detection distance, wherein the detecting includes identifying a digital footprint of the detected pedestrian;
determining, based on an analysis of the digital footprint, if the detected pedestrian is friendly;

increasing a risk tolerance threshold in response to determining that the detected pedestrian is friendly;
identifying a crime risk based upon one or more proximity parameters corresponding to a current location of the mobile device;
determining whether to alert the user of the identified crime risk based upon one or more user preferences, wherein the one or more user preferences includes at least the risk tolerance threshold; and
generating an alert in response to the determination.

17. The computer program product of claim 16 wherein the computer program code, when executed by the mobile device, causes the mobile device to perform further actions comprising:
calculating a risk value according to a set of area parameters included in the proximity parameters;
determining whether the risk value reaches the risk tolerance threshold included in the one or more user preferences; and
performing the generation of the alert in response to the risk value reaching the risk tolerance threshold.

18. The computer program product of claim 17 wherein the computer program code, when executed by the mobile device, causes the mobile device to perform further actions comprising:
identifying a risk avoidance distance included in the one or more user preferences;
determining that one or more risk areas are located within the risk avoidance distance from the current location, wherein the one or more risk areas are identified based upon the one or more historical crime statistics; and
displaying the current location and the one or more risk areas located within the risk avoidance distance.

19. The computer program product of claim 18 wherein the computer program code, when executed by the mobile device, causes the mobile device to perform further actions comprising:
determining whether a time-based risk corresponds to the risk area by comparing a current time with one or more crime times included in the one or more historical crime statistics;
determining whether a demographic-based risk corresponds to the user by comparing one or more user demographics included in the user preferences to the one or more victim demographics; and
utilizing the time-based risk and the demographic-based risk during the calculation of the risk value.

20. The computer program product of claim 16 wherein the computer program code, when executed by the mobile device, causes the mobile device to perform further actions comprising:
enabling a pedestrian detection module; and
wherein the pedestrian detection distance is included in the one or more user preferences.

* * * * *